(12) United States Patent
Botten et al.

(10) Patent No.: US 8,328,250 B2
(45) Date of Patent: Dec. 11, 2012

(54) OUTER DOOR HANDLE GASKET FOR AUTOMOTIVE VEHICLES

(75) Inventors: Eric M. Botten, Southgate, MI (US); Emiko Okuma, Novi, MI (US); Sadayuki Makino, Aichi-Ken (JP); Norio Konomoto, Aichi-Ken (JP); Todd M. Remtema, Milford, MI (US); Brett A. Campbell, Ann Arbor, MI (US)

(73) Assignees: Toyota Motor Engineering & Manufacturing North America, Inc., Erlanger, KY (US); Aisin Seiki Co., Ltd., Kariya-Shi, Aichi-Ken (JP); Aisin World Corp. of America, Plymouth, MI (US)

( * ) Notice: Subject to any disclaimer, the term of this patent is extended or adjusted under 35 U.S.C. 154(b) by 436 days.

(21) Appl. No.: 12/603,636

(22) Filed: Oct. 22, 2009

(65) Prior Publication Data
US 2010/0037529 A1 Feb. 18, 2010

Related U.S. Application Data

(62) Division of application No. 11/676,409, filed on Feb. 19, 2007, now abandoned.

(51) Int. Cl.
*E05B 3/00* (2006.01)
*F16J 15/02* (2006.01)
(52) U.S. Cl. ............. 292/336.3; 292/DIG. 56; 277/644; 277/921; 49/483.1
(58) Field of Classification Search ............... 292/336.3, 292/DIG. 71, DIG. 56; 277/628, 644, 921; 49/483.1
See application file for complete search history.

(56) References Cited

U.S. PATENT DOCUMENTS

| 2,058,010 | A | * | 10/1936 | Fitch | 277/649 |
|---|---|---|---|---|---|
| 3,508,292 | A | | 4/1970 | Bond | |
| 3,837,657 | A | | 9/1974 | Farnam et al. | |
| 3,871,034 | A | * | 3/1975 | Weigel | 4/252.6 |
| 3,930,656 | A | * | 1/1976 | Jelinek | 277/611 |
| 4,140,323 | A | | 2/1979 | Jacobs | |
| 4,203,608 | A | | 5/1980 | Nicholson | |
| 4,482,179 | A | | 11/1984 | Johnson | |

(Continued)

FOREIGN PATENT DOCUMENTS
EP 0402780 12/1990
(Continued)

*Primary Examiner* — Carlos Lugo
(74) *Attorney, Agent, or Firm* — Gifford, Krass, Sprinkle, Anderson & Citkowski, P.C.

(57) ABSTRACT

A door handle for a door of an automotive vehicle having a first gasket attached at a distal end of the door handle and a second gasket attached at a proximate end of the door handle. The first gasket and second gasket have an inner surface facing the outer surface of the door and an outer surface facing the respective ends of the door handle. The first gasket and the second gasket also include a lip formed of a resilient material, which protrudes outwardly relative to the outer surface of gaskets and extends longitudinally along the edge of the gaskets to sealingly engage the ends of the door handle. The lip is embossed so that it is recessed relative to the inner surface of the gasket to accommodate compression of the lip as the handle is displaced towards the door. A flattened portion extends from an end of the lip on the first gasket to dampen noise due to impact between the distal end of the door handle and an outer surface of the door.

7 Claims, 5 Drawing Sheets

U.S. PATENT DOCUMENTS

| | | |
|---|---|---|
| 4,676,515 A | 6/1987 | Cobb |
| 5,092,642 A | 3/1992 | Lindmayer et al. |
| 5,887,918 A * | 3/1999 | Okada et al. ............... 292/336.3 |
| 5,918,918 A | 7/1999 | Mosley |
| 6,059,329 A * | 5/2000 | Spitzley ..................... 292/336.3 |
| 6,234,041 B1 * | 5/2001 | Larabet et al. .................. 74/523 |
| 6,367,124 B1 | 4/2002 | Bella et al. |
| 6,378,921 B1 | 4/2002 | Deischl et al. |
| 6,401,302 B1 * | 6/2002 | Josserand et al. ............... 16/444 |
| 6,527,277 B2 * | 3/2003 | Hegmann ..................... 277/596 |
| 6,536,080 B2 | 3/2003 | Bella et al. |
| 6,572,159 B2 | 6/2003 | Lambertz et al. |
| 6,612,630 B1 * | 9/2003 | Meinke ......................... 292/348 |
| 7,011,349 B2 * | 3/2006 | Nomura et al. ............... 292/347 |
| 7,121,556 B2 * | 10/2006 | Barth et al. .................... 277/596 |
| 7,152,893 B2 | 12/2006 | Pudney |
| 7,520,543 B2 * | 4/2009 | Purdy et al. ................ 292/336.3 |

FOREIGN PATENT DOCUMENTS

| | | |
|---|---|---|
| GB | 2226849 | 7/1990 |

* cited by examiner

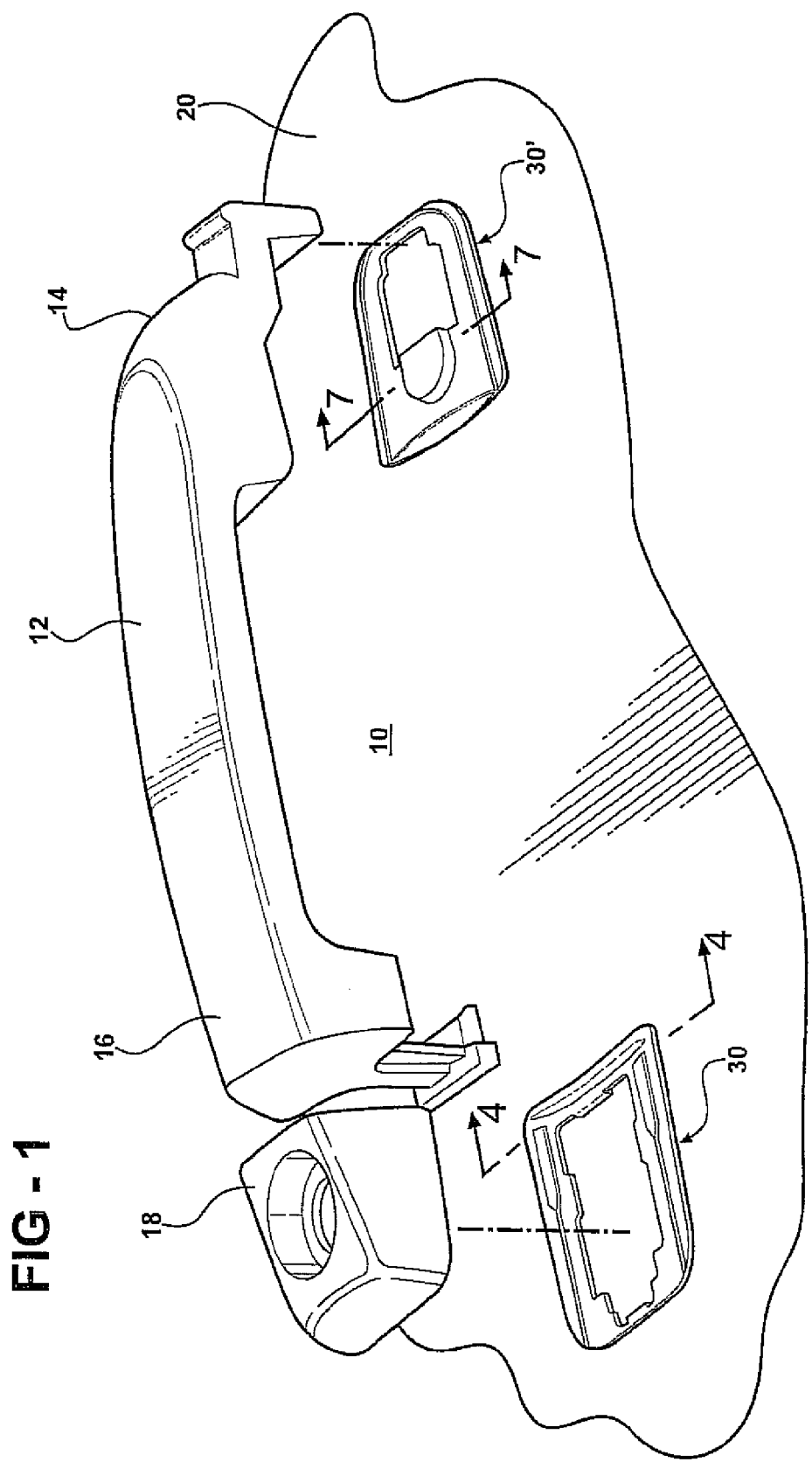

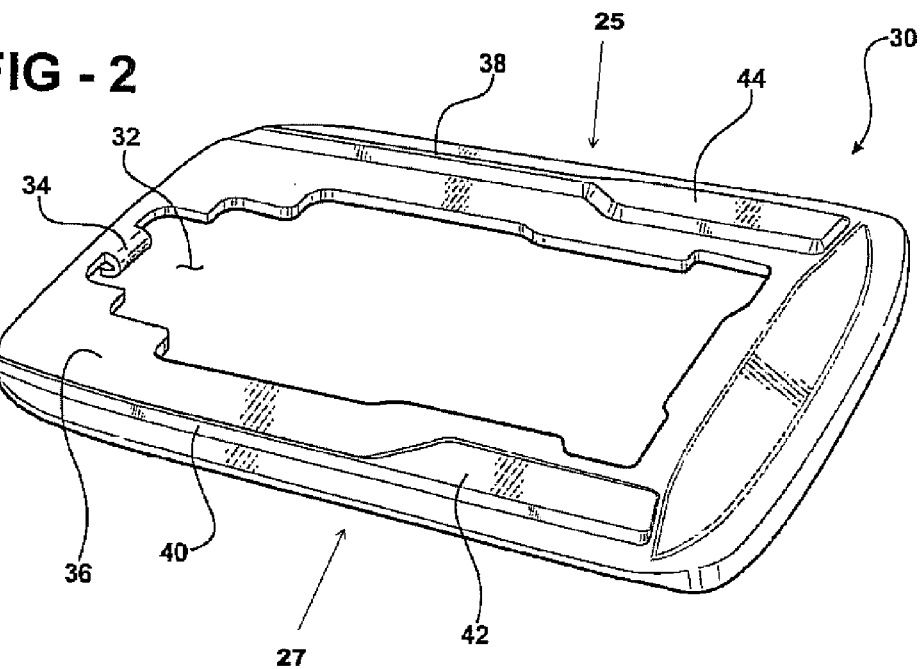
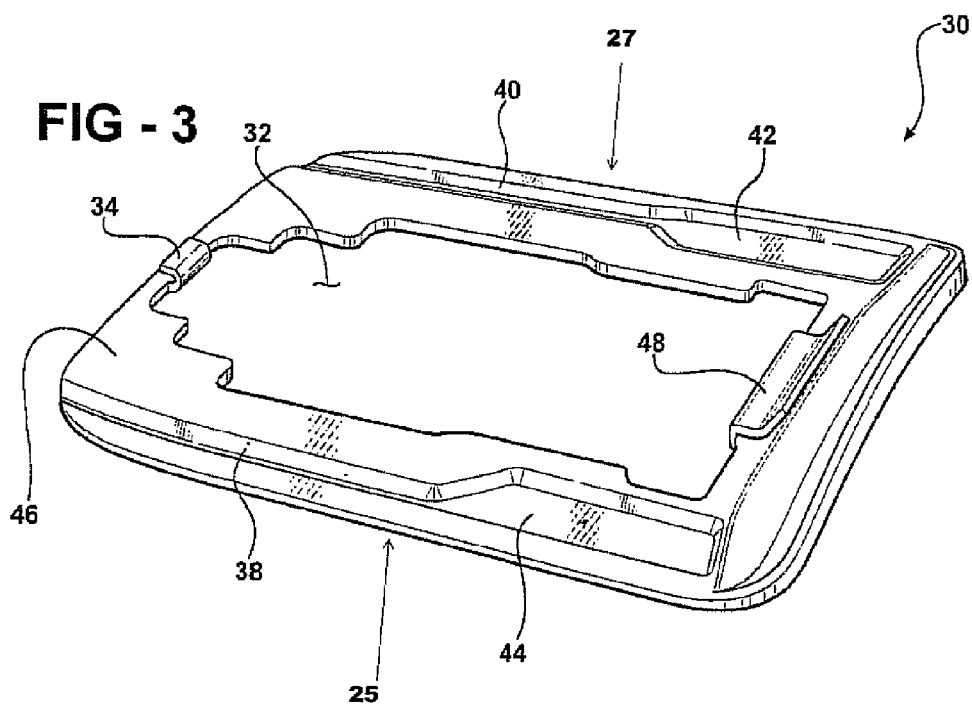

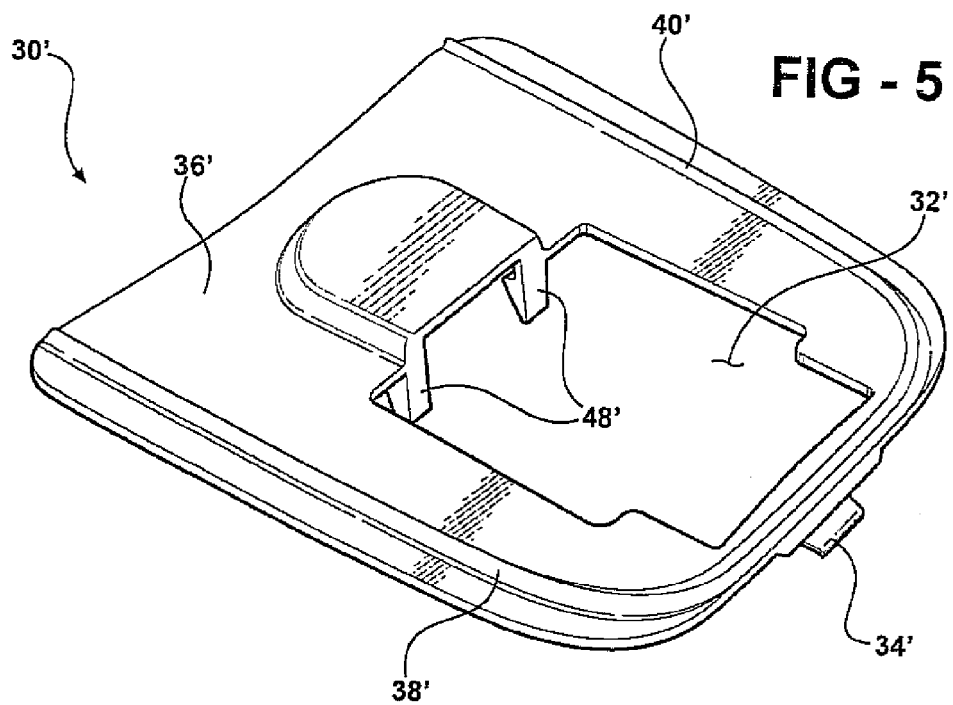
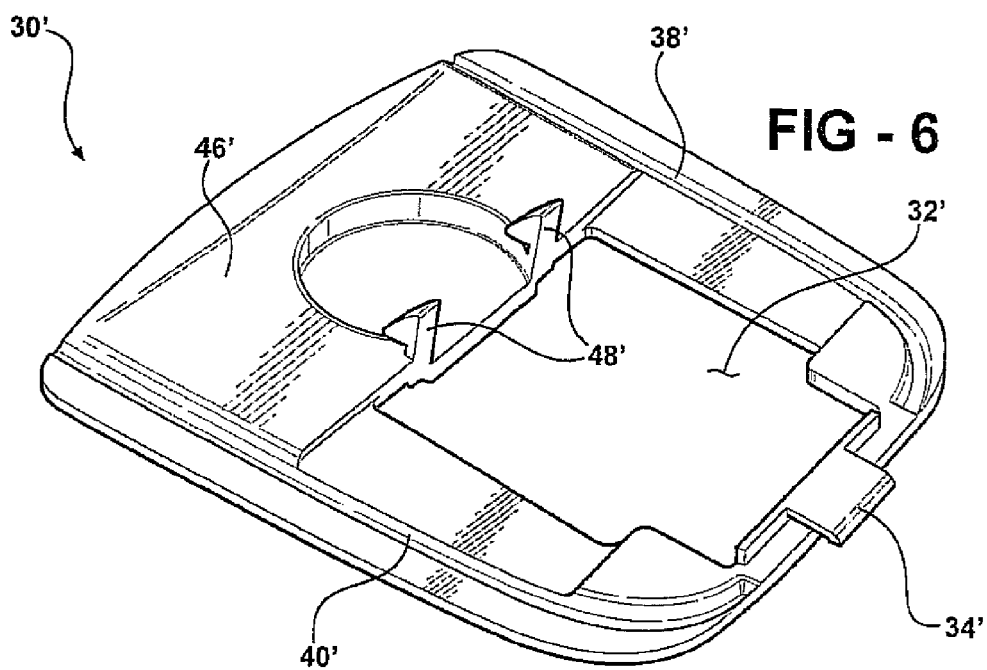

OUTER DOOR HANDLE GASKET FOR AUTOMOTIVE VEHICLES

CROSS-REFERENCE TO RELATED APPLICATIONS

This application is a divisional application of, and claims priority to U.S. patent application Ser. No. 11/676,409 filed Feb. 19, 2007, which is incorporated herein by reference.

FIELD OF THE INVENTION

The invention relates to a gasket for an outer door handle of an automotive vehicle. More particularly, the invention relates to a gasket having embossments that minimize noise associated with wind and the outer door handle impact with a door panel of the door of the vehicle.

BACKGROUND OF THE INVENTION

A vehicle door typically includes a pivoting door handle for actuating a lock or latch mechanism that retains the door to the vehicle frame. It is known in the art to provide a gasket between the handle and related bezels and the door panel to prevent water from passing there-between. It remains desirable, however, to provide an improved gasket design that minimizes noise due to wind passing over the handle and door panel and due to an impact between the handle and the door panel as the handle is released.

SUMMARY OF THE INVENTION

According to one aspect of the invention, a gasket is provided for sealing an interface between an outer surface of a door and a door handle of an automotive vehicle. The gasket includes opposite inner and outer surfaces, wherein the inner surface faces the door and the outer surface faces the handle. The gasket also includes a lip that protrudes outwardly relative to the outer surface of the gasket to sealingly engage the handle. The lip is embossed so that it is recessed relative to the inner surface of the gasket to accommodate compression of the lip as the handle is displaced toward the door.

According to another aspect of the invention, a gasket is provided for sealing an interface between an outer surface of a door and a door handle. The gasket includes an inner surface, an outer surface, a lip and a flattened portion. The inner surface faces the door. The outer surface faces the handle. The lip extends longitudinally along an edge of the outer surface of the gasket to sealingly engage the handle. The flattened portion extends from an end of the lip to dampen noise due to contact between the handle and the outside surface of the door.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is an enlarged perspective view of a vehicle door with a door handle shown in an release position;

FIG. 2 is a top perspective view of a first gasket disposed between the handle and the door according to the invention;

FIG. 3 is a bottom perspective view of the first gasket of FIG. 2;

FIG. 5 is a top perspective view of a second gasket disposed between the handle and the door according to the invention;

FIG. 6 is a bottom perspective view of the second gasket of FIG. 5; and

DETAILED DESCRIPTION OF THE PREFERRED EMBODIMENTS

Figure 4:
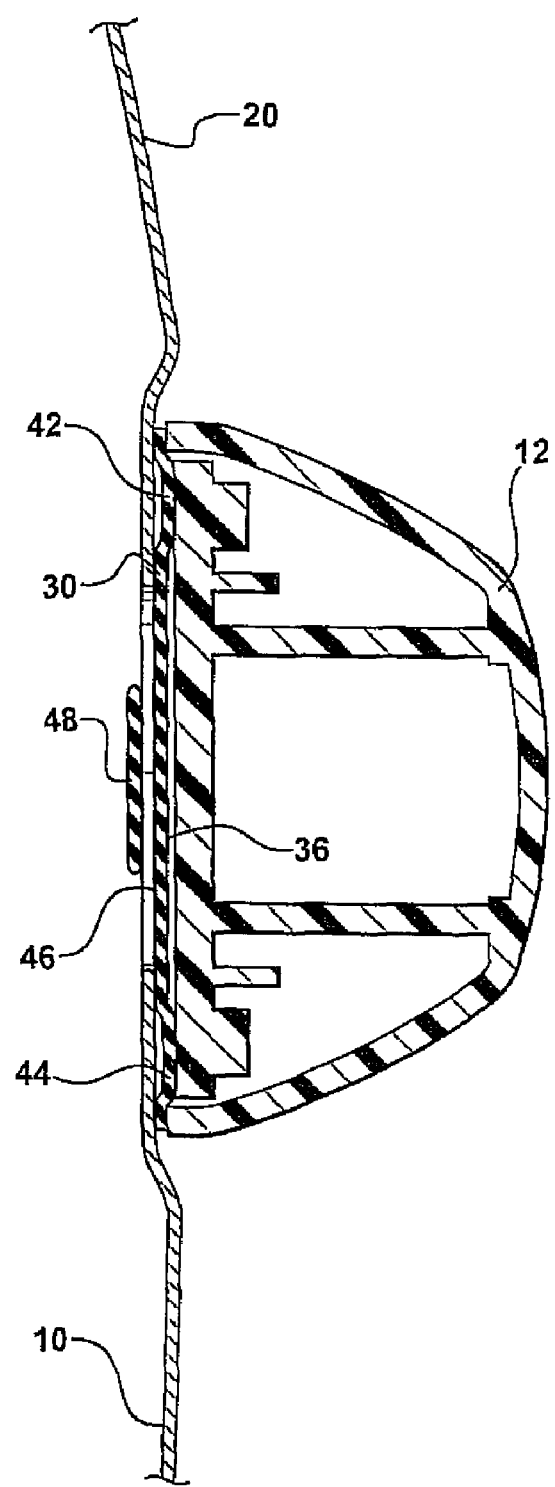
FIG. 4 is a cross sectional view taken along the line 4-4 of FIG. 1 of the door, the handle and the first gasket of FIG. 2.

Referring to FIG. 1, a vehicle door 10 for an automotive vehicle is shown with a grip door handle 12, which is used to unlatch the door 10 from the vehicle body (not shown) prior to opening the door 10. A proximal end 14 of the handle 12 is pivotally coupled to the door 10 for movement between a released position and an unreleased position. In the released position, a distal end 16 of the handle 12 is spaced apart from an outer surface of the door 10. In the unreleased position, the distal end 16 abuts the outer surface of the door 10. The handle 12 is biased toward the unreleased position by a spring (not shown). A key opening bezel 18 is fixedly secured to the door 10 adjacent to the distal end 16 of the handle 12. Described in greater detail below, gaskets are provided for sealing the interface between the handle 12, the bezel 18 and a door outer panel 11 of the door 10.

Referring to FIG. 2-4, a first gasket 30 is used to seal an interface between the door 10 and both the bezel 18 and the distal end 16 of the handle 12 in the unreleased position. The first gasket 30 has an outer surface 36 and an opposite inner surface 46. Fasteners 34, 48 extend from opposite edges of an opening 32 formed in the first gasket 30. The fasteners 34, 48 are provided in the form of hooked tabs that extend through a hole in the door outer panel 11 to secure the first gasket 30 to the door outer panel 11. The gasket 30 is secured to the door outer panel 11 by the fasteners 34, 48. Optionally, other fasteners, such as screws or adhesives may be used.

The first gasket 30 includes a pair of lips 25 and 27 which extend along opposite respective sides of the first gasket 30 to form a longitudinally extending seal with the bezel 18 and handle 12. The pair of lips 25 and 27 extend longitudinally from a first end to a second end of said first gasket 30. The pair of lips 25 and 27 are embossed, so as to be raised relative to the outer surface 36 and recessed relative to the inner surface 46. Each of the pair of lips 25 and 27 include a lip portion 38 and 40 and a flattened portion 42, 44 that contacts the distal end 16 of the handle 12 in the unreleased position. Each lip portion 38 and 40 includes an outer edge and an opposite inner edge, and each flattened portion 42 and 44 includes an outer edge and an opposite inner edge. The outer edges of each of the lip portions 38 and 40 and the outer edges of each of the flattened portions 42 and 44 are positioned adjacent one of the sides of the first gasket 30 that extends between a first end and an opposite second end. Alternatively, the flattened portions 42 and 44 may be spaced apart from the lips, instead than being a portion thereof.

While uncompressed, the pair of lips 25 and 27, including the lip portions 38 and 40 and the flattened portions 42 and 44, protrude outwardly from the outer surface 36 of the first gasket 30. The bezel 18 is assembled to the door 10 with screws or bolts and the gasket 30 is compressed between the bezel 18 and an outside surface 20 of the door outer panel 11. The pair of lips 25 and 27 are displaced toward the door 10 due to contact with the bezel 18. The recesses along the pair of lips 25 and 27 on the inner surface 46 of the gasket 30 accommodates the displacement of the lips 38, 40 toward the door 10. Contact between the bezel 18 and the pair of lips 25 and 27 creates the longitudinally seal that prevents liquid or wind from passing there-between. Further, the use of the pair of lips 25 and 27 allows the first gasket 30 to be hidden beneath the handle 12 in the unreleased position and the bezel 18.

In FIG. 4, the handle 12 is shown in the unreleased position. In this position, the handle 12 compresses the flattened portions 42, 44. The increased width or area provided by the flattened portions 42, 44 helps dampen noise and vibration associated with an impact between the handle 12 and the door outer panel 11.

In FIGS. 5 and 6, wherein like parts are indicated by like prime numerals, a second gasket is indicated at 30'. Fasteners 34', 48' in the form of hooked tabs extend from opposite edges of an opening 32' to secure the second gasket 30' to the door outer panel 11. The second gasket 30' functions substantially the same as the first gasket 30, but instead seals an interface between the door outer panel 11 and the proximal end 14 of the handle 12. The second gasket 30' has an outer surface 36' and an opposite inner surface 46'. The lips 38', 40' extends along opposite respective sides of the second gasket 30' to form a longitudinally extending seal with the handle 12. The lips 38', 40' are embossed, so as to be raised relative to the outer surface 36' and recessed relative to the inner surface 46'. The lips 33', 40' correspond in shape to the proximal end 14 of the handle 12.

Figure 7:
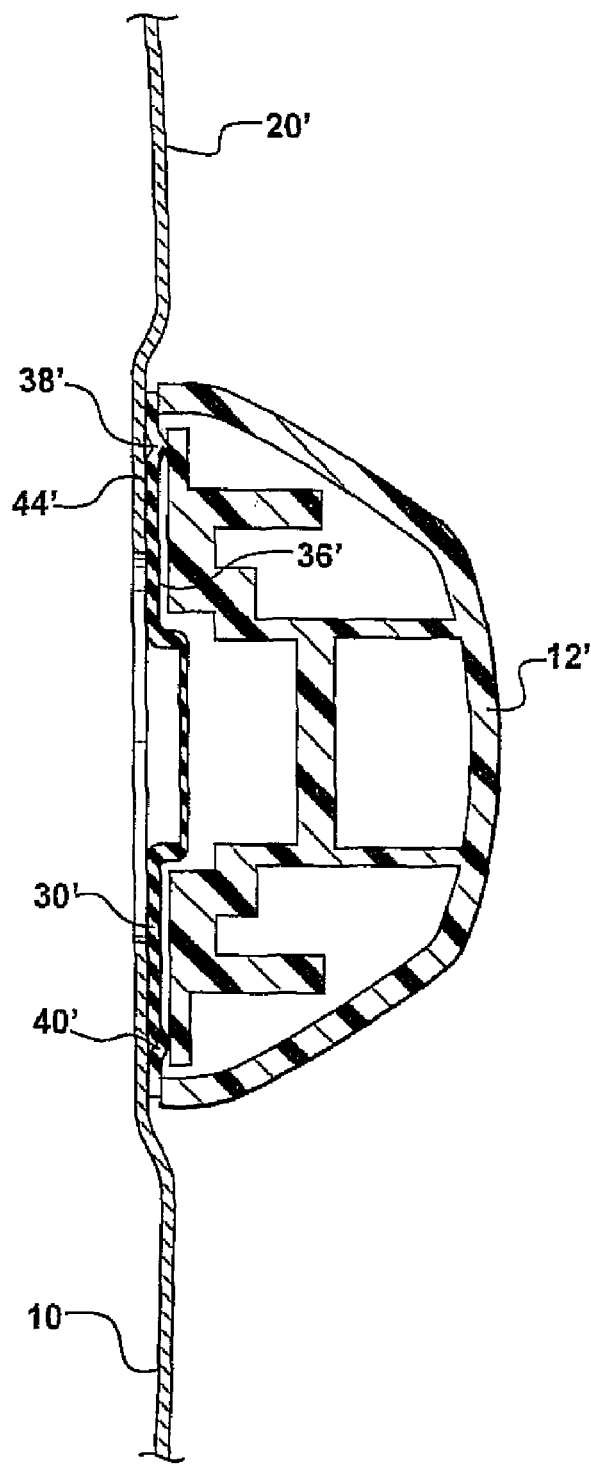
FIG. 7 is a cross sectional view taken along the line 7-7 of FIG. 1 of the door, the handle and the second gasket of FIG. 5.

While uncompressed, the lips 38', 40' protrude outwardly from the outer surface 36' of the second gasket 30'. The handle 12 is assembled to the door 10 for pivotal movement between the unreleased and released position. As shown in FIG. 7, the second gasket 30' is compressed between the handle 12 in the unreleased position and the outside surface 20 of the door outer panel 11. The lips 33', 40' are displaced toward the door 10 when the handle 12 moves to the unreleased position. The recesses along the lips 38', 40' on the inner surface 46' of the second gasket 30' accommodates the displacement of the lips 38', 40' toward the door 10. Contact between the handle 12 in the unreleased position and the lips 38', 40' creates the longitudinally seal that prevents liquid or wind from passing there-between. Further, the use of the lips 38', 40' allows the second gasket 30' to be hidden beneath the handle 12 in the unreleased position.

The gaskets 30, 30' may be molded from rubber. Alternatively, the gaskets 30, 30' may be formed from other suitable elastomeric or elastically flexible materials and processes known by those having ordinary skill in the art.

The invention has been described in an illustrative manner. It is, therefore, to be understood that the terminology used is intended to be in the nature of words of description rather than of limitation. Many modifications and variations of the invention are possible in light of the above teachings. For example, in the illustrated embodiment, the lips are substantially straight to engage corresponding edges or surfaces of the bezel. It should be readily appreciated, however, that the lips may be curved or otherwise shaped to correspond with the shape of the bezel and/or handle. As another example, the gaskets may be coupled to the bezel and/or handle as a pre-assembly and held in place along the door when the bezel and/or handle are fixedly secured to the door. Thus, within the scope of the appended claims, the invention may be practiced other than as specifically described.

We claim:

1. A door entry assembly attached to an outer surface of a door, said assembly comprising:

a door handle having a proximate end and a distal end, said proximate end being pivotally coupled to the door for movement between a released position and an unreleased position, said distal end being spaced apart from the outer surface when in the released position and said distal end abuts the outer surface when in the unreleased position;

a first gasket disposed between said distal end and the outer surface of the door for reducing noise due to wind and contact between said distal end and the outer surface of the door, said first gasket having an inner surface facing the outer surface of the door and an outer surface facing said distal end of said door handle, said first gasket having a pair of first lips extending longitudinally from a first end to a second end of said first gasket, said first pair of lips positioned on opposite sides of said first gasket to engage corresponding opposite sides of said distal end of said door handle, said pair of first lips formed of a resilient material which protrudes outwardly relative to said outer surface of said first gasket to sealingly engage said distal end, said pair of first lips being embossed so that it is recessed relative to said inner surface to accommodate compression of said pair of first lips when said door handle is in said unreleased position, said pair of first lips moveable from a compressed position to an uncompressed position upon movement of said door handle from said unreleased position to said released position, each one of said pair of first lips having a lip portion and a flattened portion, said lip portion having an outer edge and an opposite inner edge and said flattened portion having an outer edge and an opposite inner edge, said outer edge of each of said flattened portions and said outer edge of each of said lip portions positioned adjacent one of said sides extending between said first end and said second end of said first gasket, each of said pair of first lips formed such that a distance between said inner edge and said outer edge of said flattened portion is greater than a distance between said inner edge and said outer edge of said lip portion; and a second gasket disposed between said proximate end and the outer surface of the door for reducing noise due to wind, said second gasket having an inner surface facing the outer surface of the door and an outer surface facing said proximate end of said door handle, said second gasket having a second lip formed of a resilient material which protrudes outwardly relative to said outer surface of said second gasket to sealingly engage said proximate end, said second lip being embossed so that it is recessed relative to said inner surface to accommodate compression of said second lip when said door handle is in said unreleased position, said second lip moveable from a compressed position to an uncompressed position upon movement of said door handle from said unreleased position to said released position.

2. The door entry assembly as set forth in claim 1, wherein said second lip is a second pair of lips that are positioned on opposite sides of said second gasket to engage corresponding opposite sides of said proximate end of said door handle.

3. The door entry assembly as set forth in claim 2, wherein each of said first pair of lips extends longitudinally along opposite sides of said first gasket to form a longitudinally extending seal between the outer surface of the door and said distal end of said door handle, and wherein each of said second pair of lips extends longitudinally along opposite sides of said second gasket to form a longitudinally extending seal between the outer surface of the door and said proximate end of said door handle.

4. The door entry assembly as set forth in claim 3, wherein said first gasket includes a first opening disposed between said first pair of lips, and wherein said second gasket includes a second opening disposed between said second pair of lips.

5. The door entry assembly as set forth in claim 4, wherein said first gasket includes hooked fasteners formed along opposite edges of said first opening, and wherein said second gasket includes hooked fasteners formed along opposite edges of said second opening.

6. The door entry assembly as set forth in claim 1, wherein each of said first flattened portion dampens noise due to contact between said distal end of said door handle and the outer surface of the door.

7. The door entry assembly as set forth in claim 1, wherein said outer edge of each of said first flattened portion extends collinearly with one of said outer edge of said first lip portion.

* * * * *

UNITED STATES PATENT AND TRADEMARK OFFICE
CERTIFICATE OF CORRECTION

PATENT NO. : 8,328,250 B2  Page 1 of 1
APPLICATION NO. : 12/603636
DATED : December 11, 2012
INVENTOR(S) : Eric M. Botten et al.

It is certified that error appears in the above-identified patent and that said Letters Patent is hereby corrected as shown below:

In the Specification:

Column 3, line 25, Delete "33', 40'" Insert --38', 40'--

Signed and Sealed this
Sixth Day of January, 2015

Michelle K. Lee
*Deputy Director of the United States Patent and Trademark Office*